United States Patent [19]
Grinbergs

[11] Patent Number: 6,082,704
[45] Date of Patent: Jul. 4, 2000

[54] CONNECTION COLLAR HAVING AN ADJUSTABLE DAMPER

[75] Inventor: Peter Karl Grinbergs, Dorchester, Canada

[73] Assignee: Nutech Energy Systems Inc., Dorchester, Canada

[21] Appl. No.: 09/316,951

[22] Filed: May 24, 1999

[51] Int. Cl.[7] .................................................. F16K 35/00
[52] U.S. Cl. ............................... 251/96; 251/97; 251/306
[58] Field of Search .................................. 251/95, 96, 97, 251/305, 306, 308

[56] References Cited

U.S. PATENT DOCUMENTS

| | | | |
|---|---|---|---|
| 3,383,086 | 5/1968 | Ryen ............................................ | 251/306 |
| 3,477,690 | 11/1969 | Murota et al. ............................. | 251/306 |
| 3,497,180 | 2/1970 | Ryen ............................................ | 251/306 |
| 3,502,299 | 3/1970 | Phillips ....................................... | 251/306 |
| 3,941,151 | 3/1976 | Biddle . | |
| 4,628,954 | 12/1986 | Daynus . | |
| 4,715,518 | 12/1987 | Myers ......................................... | 251/308 |
| 4,744,290 | 5/1988 | Josephson . | |
| 5,370,360 | 12/1994 | Buckley . | |
| 5,806,830 | 9/1998 | Alvarez . | |
| 5,813,430 | 9/1998 | De Leon . | |
| 5,857,617 | 1/1999 | Weng . | |

*Primary Examiner*—Kevin Shaver
*Assistant Examiner*—David A. Bonderer

[57] ABSTRACT

The present invention relates to a connection collar for a duct ventilation system and furnace. The connection collar is comprised of a self-guiding and self-locking damper valve, which when positioned becomes part of a completely sealable joint when used with preferably flexible insulated heating pipe. With the adjusting apparatus and locking apparatus completely contained within the connection collar the connection collar forms a vapor barrier when used with the preferable pipe and or furnace. The self-locking and self-guiding apparatus comprises of a spring biasing arrangement and a cone shaped receiver equipped with catch teeth which when engaged mate with teeth circumferentially positioned on the damper apparatus.

12 Claims, 3 Drawing Sheets

CONNECTION COLLAR HAVING AN ADJUSTABLE DAMPER

FIELD OF THE INVENTION

The present invention relates to a duct connection collar for a duct ventilation system and furnace. More particularly the present invention relates to the shape of the connection collar and a damper to balance the airflow into the connection collar.

BACKGROUND OF THE INVENTION

Balancing the airflow through a duct system or furnace is a necessary step in effectively heating or cooling a modem home. Many designs accomplish this using an adjustable damper device which requires some method of ensuring that the damper does not move once it is adjusted. This may involve tightening a nut or using a screw.

One such system is described in U.S. Pat. No. 5,806,830 which issued on Sep. 15, 1998. That patent describes a plastic collar for joining ventilation ducts in a forced air system. An adjustable damper is disclosed and is controlled by a conventional wing nut and lever arrangement, positioned on the exterior surface of the duct so as to be adjusted manually. The lever is attached directly to a damper valve inside the collar in the air flow. Adjustment is made by loosening the wing nut by hand, maneuvering the lever arrangement into the desired position, and finally tightening the wing nut by hand.

This device has proved to be popular but, however there are disadvantages. The mechanism is not self-locking and can therefore easily be positioned incorrectly or accidentally. The adjusting mechanism is also placed on the exterior surface of the collar exposing it to the outside environment. This causes three problems. Firstly it increases the chance of the mechanism being damaged or accidentally repositioned. Secondly it allows for the air within the ventilation system to leak out into the outside environment making the ventilation system less efficient. Finally, this system does not allow for an effective vapor barrier to be made around the collar body.

Another such system is described in U.S. Pat. No. 4,628,954 which issued on Dec. 16, 1986. That patent describes a damper to be positioned in an air outlet. The damper valve has a butterfly shape and does not rotate to vary airflow but opens and closes from a middle pivot. The damper valve is adjusted manually by insertion of a tool into the damper mechanism where torque is provided to a worm gear which controls the position of the damper valve. The damper is for use only in an air outlet and does not include catch teeth or a spring biasing arrangement.

In addition, none of the prior art utilizes a damper valve with flexible or rigid insulated pipe.

The present invention uses a mechanism whereby the damper valve is held in position by spring tension which force gear teeth on the damper rod into mating gear teeth in the inner collar body thus making the damper self-locking. Adjustment is carried out by inserting a screwdriver through a sealable aperture and into a receptacle and then pushing inwardly, against the spring biassing arrangement, thereby releasing the mating teeth and therefore releasing the damper rod and inner collar body. Once the gear teeth are released turning the screwdriver, and with it the damper rod and damper valve, will adjust the airflow. Once the pressure is released, the damper will lock by mating with the gear teeth on the inner collar body. The screwdriver can then be removed and the aperture resealed.

SUMMARY OF THE INVENTION

The invention seeks to overcome the foregoing disadvantages by provision of a spring biassing arrangement that pushes gear teeth circumferentially positioned on a disk like object located on the damper rod of the damper apparatus into a receiving apparatus having gear catch teeth, located on the inside of the inner collar body of the connection collar. The entire assembly is located, at all times, totally within the connection collar. The damper valve is adjusted by turning the damper rod using a screwdriver inserted through an aperture in the connection collar in such a way that when not being adjusted a small clear aperture is present that can be sealed with tape. An additional feature of this connection collar is that it is preferably used with, flexible or rigid, insulated heating pipe. The connection collar can also perform a connection between a flat surface, such as a furnace and a flexible or rigid insulated heating pipe.

The present invention is directed to a connection collar having an adjustable damper, comprising: a support means; an adjustable damper means; spring biassing means pivotally connected to said support means; adjusting means pivotally connected to said support means; and an adjustable locking means comprising a first portion mounted on the support means and a second portion mounted on the adjusting means; wherein said adjustable damper means, said spring biassing means, said adjusting means and said adjustable locking means are all located within said support means; and wherein said second portion of said adjustable locking means and said adjustable damper means are adapted to be urged by said adjusting means against said spring biassing means away from said first portion locking means so that said adjustable damper means can be rotated within said support means.

BRIEF DESCRIPTION OF THE DRAWINGS

The present invention will be described below in detail with the aid of the accompanying drawings, in which.

DETAILED DESCRIPTION OF EMBODIMENTS

Figure 1:
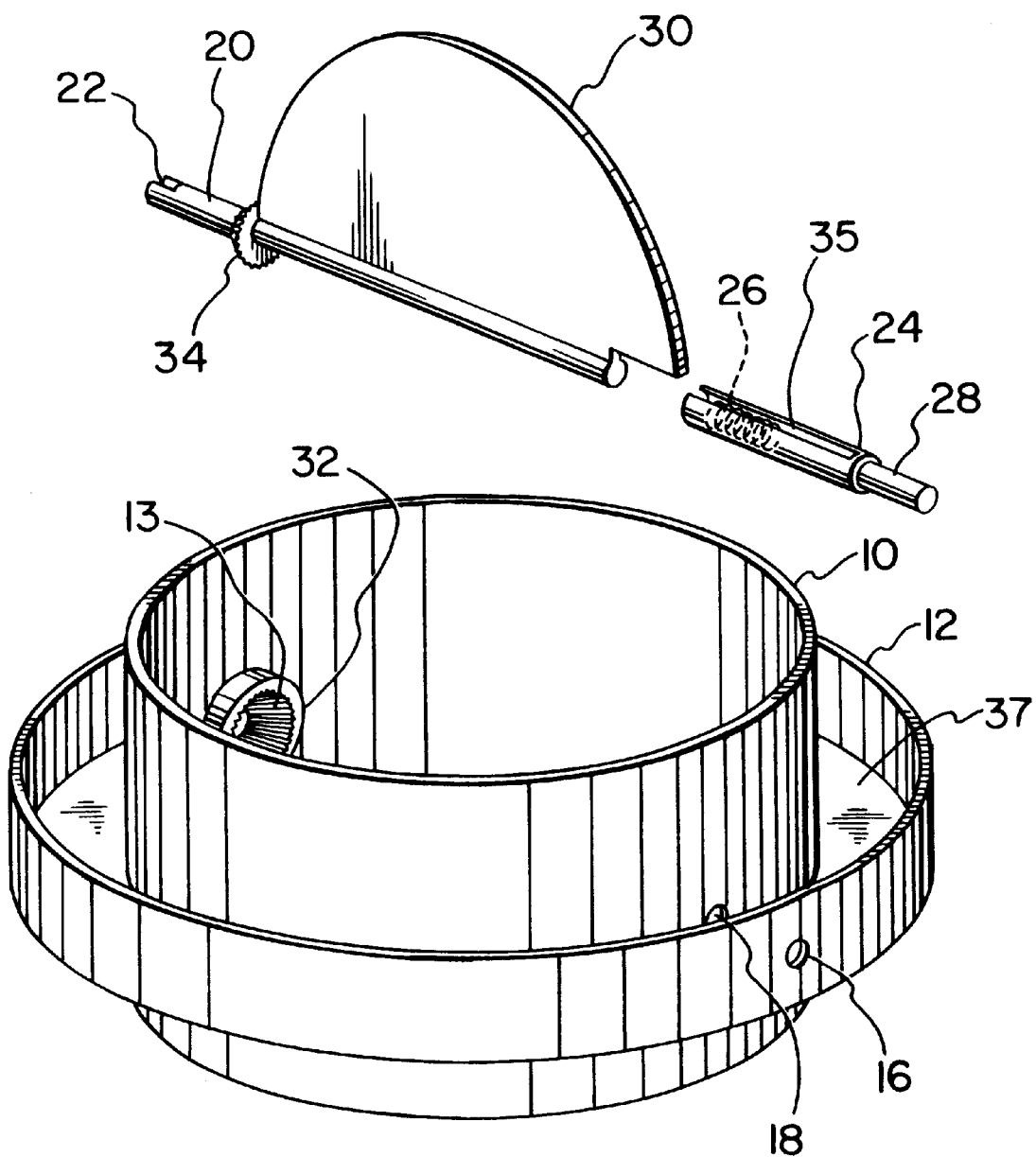
FIG. 1 is an exploded perspective view of a connection collar, a damper apparatus with a 180° damper valve, and a spring biassing arrangement.
Figure 3:
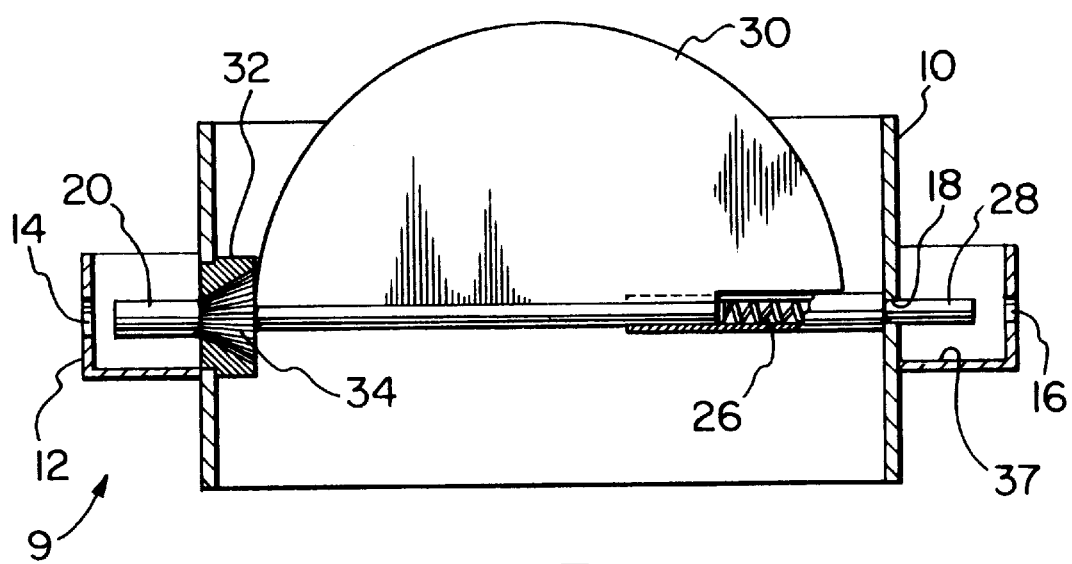
FIG. 3 is a cross-sectional view of a connection collar with the damper apparatus and spring biassing arrangement in place.

A connection collar 9 is comprised of an inner collar body 10. The inner collar body 10 has an exterior standard pipe diameter of 6 inches in order to accommodate the interior surface of a standard insulated heating pipe (it should be noted that this particular dimension is not meant to limit the invention in any way). Attached along the interior wall of the inner collar body 10 is a receiving apparatus 32, as shown in FIG. 1, which is shaped in the form of a cone so as to be self-guiding when receiving damper rod gear teeth 34. The receiving apparatus 32 also comprises gear teeth which are strategically positioned to mate with the damper rod gear teeth 34 so as to be self-locking. The receiving apparatus 32 includes a centrally located aperture 13 which is located in direct alignment with apertures 14, 16 and 18 as shown in FIG. 1 and FIG. 3.

Surrounding the inner collar body 10 is a radial rib 37 which extends 1 inch beyond the inner collar body 10 (1 inch. being the standard thickness of an insulated heating pipe). The radial rib 37 acts as a spacer to accommodate the insulation of the insulated heating pipe preferably used with this connection collar. When used in conjunction with a furnace the radial rib 37 acts as the preferable means by which the connection collar 9 is attached to the furnace.

Along the outside edge of the radial rib 37 is the outer collar body 12. The outer collar body 12 serves as the place of attachment of the outer shell of the insulator pipe to be described in more detail below. The outer collar body 12 being smooth acts as a vapor barrier when used in conjunction with a standard insulated heating pipe and a standard means of attachment.

Figure 2:
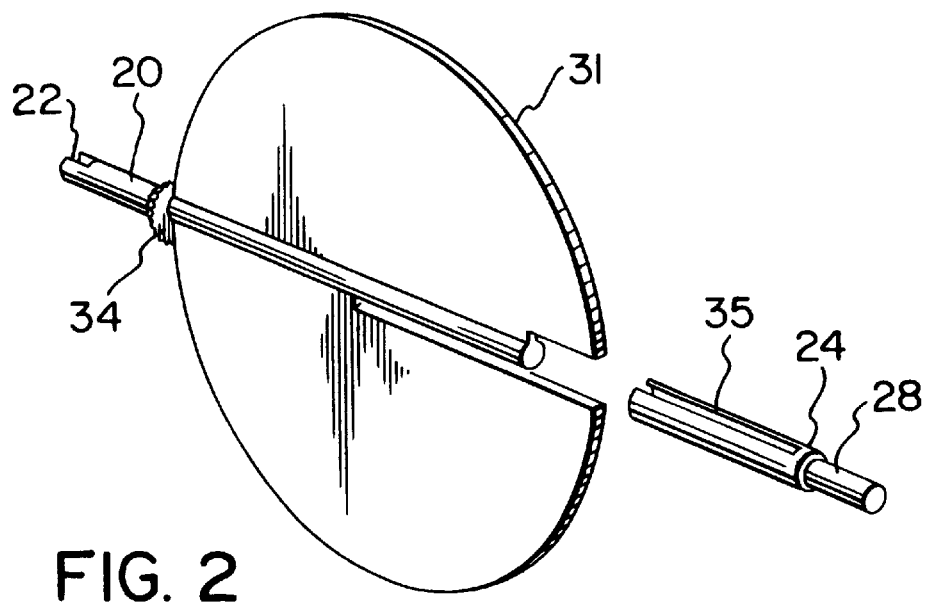
FIG. 2 is a perspective view of a damper apparatus with a 360° damper valve, and the spring biassing arrangement.

The damper apparatus as shown in FIG. 1 and FIG. 2 comprises the damper rod 20 which controls the position of the damper valve 30 or 31 and is adjusted when a straight slotted screwdriver is inserted through aperture 14 and into the screwdriver receptacle 22 on the damper rod 20. Damper rod gear teeth 34 are attached circumferentially around the damper rod 20 and mate with the receiving apparatus 32 of the inner collar body 10. The spring biassing arrangement 24 controls whether or not the gear teeth engage each other or if the damper apparatus is in its adjustable position. When pressure is applied to the damper rod 20 using a screwdriver engaged in receptacle 22, the spring 26 of the spring biassing arrangement 24 compresses and the damper apparatus shifts, disengaging the damper rod gear teeth 34 from the receiving apparatus 32. The damper valve can then be adjusted by turning the screwdriver. When pressure is released from the damper rod 20 the damper apparatus repositions itself in the operating position and the damper rod gear teeth 34 reengage the receiving apparatus 32.

The spring biassing arrangement 24 is held in place in the inner collar body 10 by the spring biassing arrangement mount 28 and the aperture 18 in the inner collar body 10. The spring biassing arrangement is shaped in such a way that it allows for the damper apparatus to slide through a grove 35 on the upper side of the spring biassing arrangement 24, connecting the damper apparatus to the spring biassing arrangement and ensuring a constant contact between the damper apparatus and the spring 26. When inward pressure is applied to the damper apparatus, the apparatus slides along the grove 35 of the spring biassing arrangement and compresses the spring 26. When the pressure is released, the damper apparatus slide back through the grove 35 into position and spring 26 decompresses.

When the connection collar 9 is assembled, as shown in FIG. 3, the damper apparatuses of FIG. 1 and FIG. 2 are interchangeable. The damper valve 31 differs from damper valve 30 in that it is a 360° valve and not a 180° valve like that of damper valve 30. The 360° damper valve 31 restricts the airflow more and is used in place of damper valve 30 when determined to be more beneficial.

Figure 4:
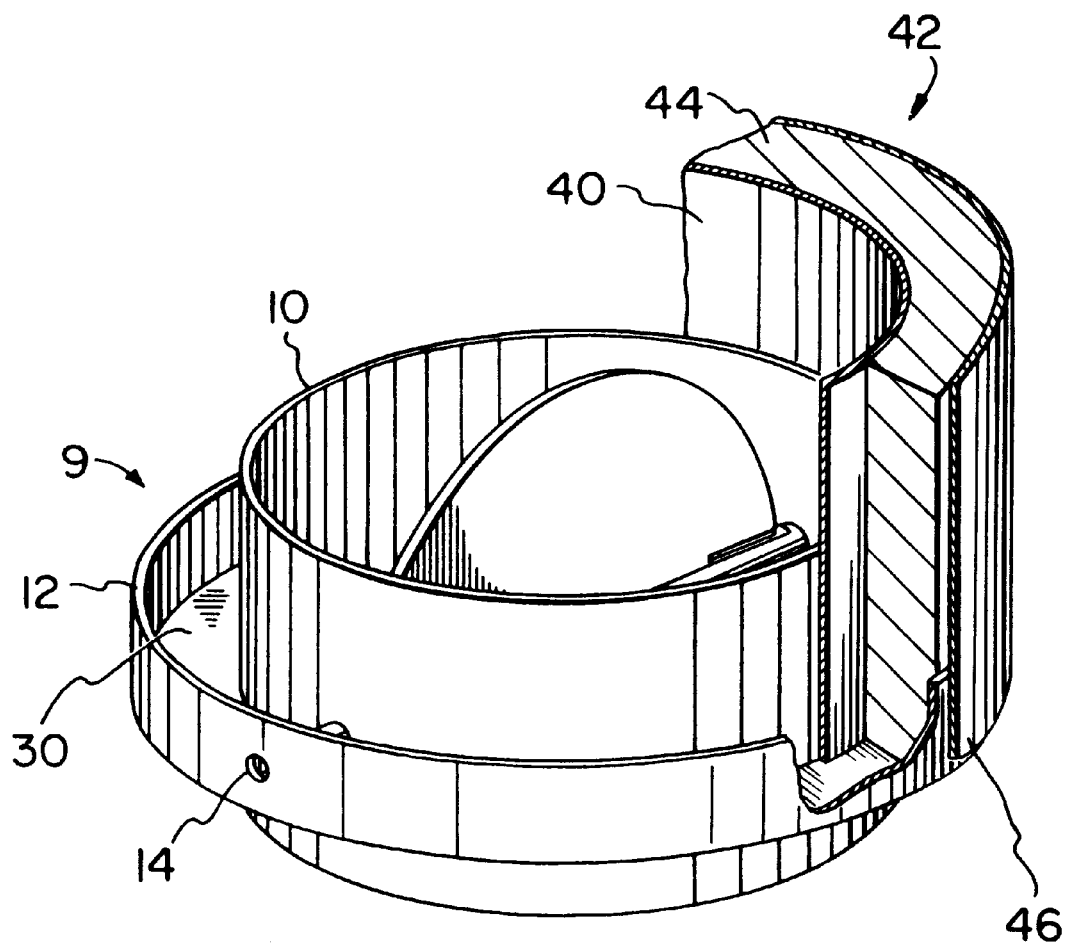
FIG. 4 is a perspective view of one embodiment of the present invention attached to an insulated pipe.

As shown in FIG. 4 an insulated heating pipe 42 attaches to the connection collar 9 by first attaching inner pipe 40 of insulated heating pipe 42 to the inner collar body 10. The radial rib 37 provides space for insulation 44 of the insulated heating pipe 42. Once the damper valve 30 or 31 has been adjusted using the adjusting means, the outer shell 46 of the insulated heating pipe 42, shown in FIG. 4, can be pulled over apertures 14 and 18 and attached to the outer collar body 12. The outer collar body 12 is smooth so that when properly attached to the outer shell of the insulated heating pipe it forms a vapor barrier. The outer collar body 12 is smooth because all the valve operating and adjusting mechanisms are filly enclosed by the connector pipe.

What is claimed is:

1. A connection collar having an adjustable damper, comprising:
   a support means;
   an adjustable damper means;
   spring biassing means pivotally connected to said support means;
   adjusting means pivotally connected to said support means; and
   an adjustable locking means comprising a first portion mounted on the support means and a second portion mounted on the adjusting means;
   wherein said adjustable damper means, said spring biassing means, said adjusting means, and said adjustable locking means are all located within said support means; and
   wherein said second portion of said adjustable locking means and said adjustable damper means are adapted to be urged by said adjusting means against said spring biassing means away from said first portion locking means so that said adjustable damper means can be rotated within said support means.

2. The connection collar of claim 1, wherein the support means is comprised of an inner collar body; an outer collar body and a radial rib connecting said inner collar body and said outer collar body.

3. The connection collar of claim 2, wherein said inner collar body and said outer collar body are substantially cylindrical.

4. The connection collar of claim 3, wherein said inner collar body includes two apertures for mounting said spring biassing means and said adjusting means.

5. The connection collar of claim 4, wherein said outer collar body includes two apertures for adjusting said spring biassing means and said adjusting means.

6. The connection collar of claim 5, wherein said spring biassing means comprises a hollow cylinder open at one end and having a helical spring located therein, said hollow cylinder having a grove running lengthwise to allow for relative movement between said spring biassing means and said adjustable damper means so that said adjustable damper means can move within said support means; and a cylindrical protrusion attached opposite said open end for communication with one of said two apertures in said inner collar body for mounting said spring biassing means within said support means.

7. The connection collar of claim 6, wherein said adjustable damper means comprises a 180° damper.

8. The connection collar of claim 6, wherein said adjustable damper means comprises a 360° damper.

9. The connection collar of claim 7 or 8, wherein the said first portion of said adjustable locking means comprises radial gear teeth positioned on an interior surface of a conical body attached to said inner collar body; and said second portion of said adjustable locking means comprises mating radial gear teeth positioned on an exterior surface of a conical body attached to said adjusting means wherein said adjusting means can move said second portion gear teeth out of engagement with said first portion gear teeth to allow adjustment of said damper means.

10. The connection collar of claim 9, wherein said inner collar body and said outer collar body are adapted for connecting inner and outer shells of an insulated heating pipe and inner and outer shells of another insulated heating pipe.

11. The connection collar of claim 10, wherein said inner collar body and said outer collar body are adapted for connecting inner and outer shells of an insulated heating pipe and a furnace.

12. The connection collar of claim 11, wherein said adjusting means comprises a damper rod; a receptacle positioned on the end of the damper rod for use with a straight slotted screwdriver inserted through one aperture of said two apertures in said outer collar body, and said second portion of the locking means.

* * * * *